(12) United States Patent
Perry

(10) Patent No.: US 6,340,079 B1
(45) Date of Patent: Jan. 22, 2002

(54) BRAKE DRUM COVER SYSTEM

(76) Inventor: Robert Perry, 10015 Fenner Ave. SE., Delano, MN (US) 55328

( * ) Notice: Subject to any disclaimer, the term of this patent is extended or adjusted under 35 U.S.C. 154(b) by 0 days.

(21) Appl. No.: 09/548,646

(22) Filed: Apr. 13, 2000

(51) Int. Cl.[7] ............................................. F16D 65/01
(52) U.S. Cl. ................................................... 188/218 A
(58) Field of Search ........................ 188/218 A, 264 W, 188/18 A; 301/37.1, 6.41

(56) References Cited

U.S. PATENT DOCUMENTS 4,540,069 A * 9/1985 Bolenbaugh ............ 188/218 A
6,073,734 A * 6/2000 Davidson ................ 188/218 A

* cited by examiner

Primary Examiner—Christopher P. Schwartz
Assistant Examiner—C. T. Bartz
(74) Attorney, Agent, or Firm—Hugh D. Jaeger

(57) ABSTRACT

A heavy duty brake drum cover system including two semicircular plates which mount over and about the axle housing and the S-cam which cover the brake drums. The brake drum cover system prevents dirt, gravel and other debris from entering the brake drum and causing excessive wear to the brake drums and shoes. Also provided are brake shoe inspection holes which allow the user to inspect the brake shoes without removing the brake drum cover system. The brake drum cover system are intended for hopper bottom style trailers, but could be modified to suit any other brake system.

1 Claim, 3 Drawing Sheets

BRAKE DRUM COVER SYSTEM

CROSS REFERENCES TO CO-PENDING APPLICATIONS

None.

BACKGROUND OF THE INVENTION

Field of the Invention

The present invention is for a brake drum cover system to be used in the trucking industry, more specifically, to be mounted in close proximity over the interior side of brake drums used in, but not limited to hopper-bottom style trailers.

SUMMARY OF THE INVENTION

The general purpose of the present invention is a brake drum cover system.

According to one embodiment of the present invention, there is provided two semicircular plates, including perpendicularly oriented collars, and nut and bolt sets for securing the two plates together over and about an axle housing. Holes are provided to accommodate the axle housing and the S-cam. Another set of holes allows for visual inspection of the brake shoes. There are also provided a plurality of vertical alignment screws which allow the user the ability to properly position and center the brake drum cover in close proximity to the brake drum. The vertical alignment screws also secure the brake drum cover to the axle housing. Finally, there are provided fittings for delivering grease to the S-cam bushings without removing the brake drum cover system.

One significant aspect and feature of the present invention is a two piece design which is easily mounted and removed.

Another significant aspect and feature of the present invention is a plurality of vertical alignment screws which afford a snug fit.

Still another significant aspect and feature of the present invention is a central hole fashioned by opposing radiused semicircular cutouts which accommodates the axle housing.

Yet another significant aspect and feature of the present invention is hole which accommodates the S-cam of air brakes.

A further significant aspect and feature of the present invention is two different locations for grease fittings to be mounted for the most direct connection.

A still further significant aspect and feature of the present invention is a remote greasing means for lubricating the S-cam bushings without removing the brake drum cover system.

Having thus described embodiments of the present invention, it is the principal object of the present invention to provide a brake drum cover system.

One object of the present invention is to provide a means of limiting the amount of dirt or debris from entering the brake drum.

Another object of the present invention is to provide a brake cover that is easily mounted and removed.

Yet another object of the present invention is to provide a means of extending the life of brake drums and shoes, in turn, cutting maintenance costs.

Still another object of the present invention is to provide a means to limit the down-time and D.O.T. enforcement of "out of service" violations due to brake repairs and replacement.

A further object of the present invention is to provide a brake drum cover system which allows the user to grease the brake system without removing the brake drum cover system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figure thereof and wherein.

DETAILED DESCRIPTION OF THE PREFERRED EMBODIMENTS

Figure 1:
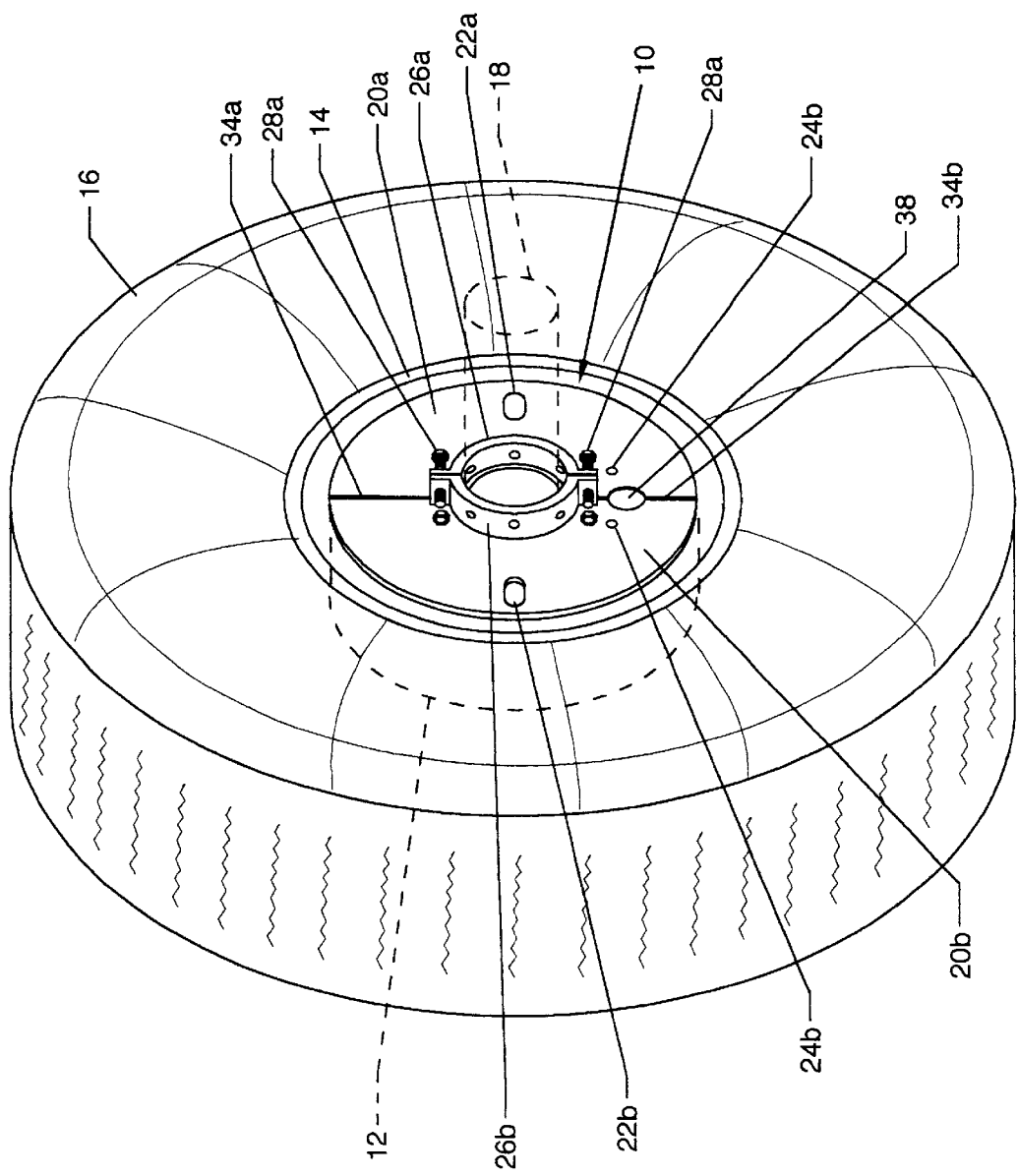
FIG. 1 illustrates a perspective view from the bottom of a brake drum cover system, the present invention.

FIG. 1 illustrates a perspective view from the bottom of a brake drum cover system 10, the present invention. Also illustrated for purposes of clarity are a brake drum 12, a wheel 14, a tire 16 and an axle housing 18. The brake drum cover system 10 is comprised of two semicircular plates 20a and 20b, each having semicircular and radiused cutouts 21a and 21b, best shown in FIG. 3. Also included are brake shoe inspection holes 22a and 22b, grease fitting holes 24a and 24b, and axle housing collars 26a and 26b, respectively. The brake shoe inspection holes 22a and 22b, which can optionally include flexible rubber plugs, allow the user to visually inspect the brake shoes without removing the brake drum cover system 10. The brake drum cover system 10 will be further described in detail in the following figures.

Figure 2:
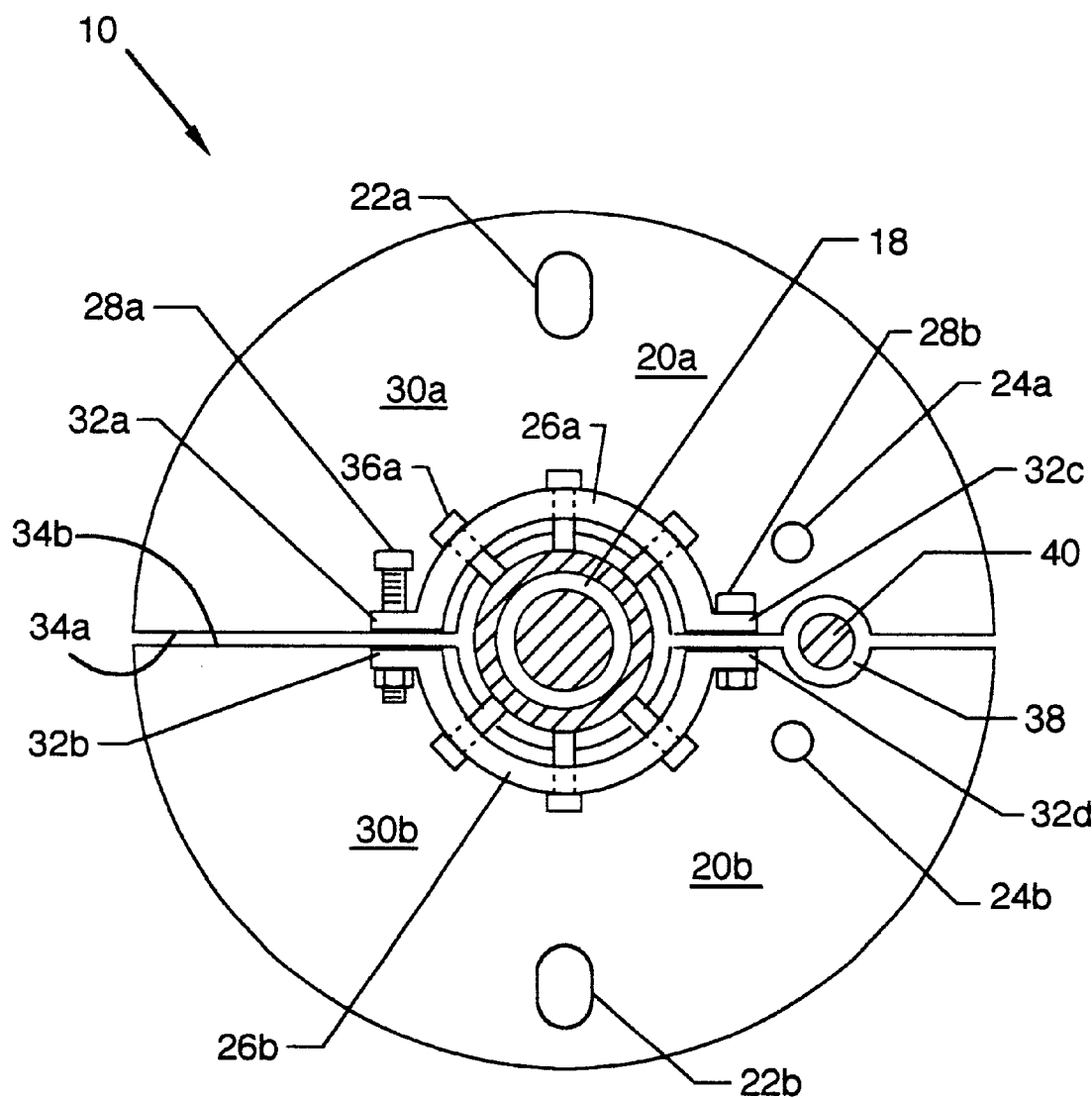
FIG. 2 illustrates a front view of the brake drum cover system.

FIG. 2 illustrates a front view of the brake drum cover system 10, where all numerals correspond to those elements previously described. The semicircular plates 20a and 20b are aligned over and about the axle housing 18 in a vertical fashion where planar portions 30a and 30b of the semicircular plates 20a and 20b abut at interrupted edges 34a and 34b. The axle housing collars 26a and 26b extend outwardly and perpendicularly from planar portions 30a and 30b of the semicircular plates 20a and 20b, respectively, and each incorporate a pair of flanges 32a–32d through which two sets of nuts and bolts 28a and 28b pass and secure the semicircular plates 20a and 20b together. At this point, the brake drum cover system 10 can still be rotated. There are also provided a plurality of vertical alignment screws 36a–36n which secure the brake drum cover system 10 in position when the brake drum cover system 10 is properly oriented and the interior surfaces of the semicircular plates 20a and 20b align in close proximity to the brake drum 12. These vertical alignment screws 36a–36n allow for close fitting of the brake drum cover system 10 in close proximity to the brake drum 12, even if the brake drum 12 is slightly toed in or out. There is also provided, an S-cam hole 38 accommodating the S-cam 40 of air brake systems. The grease fitting holes 24a and 24b give the user the option of mounting an appropriate fitting in either grease fitting hole 24a or 24b, depending on where the brake system grease is needed. No grease fitting is illustrated, but it is understood that at least one grease fitting needs to be used in one of the two grease fitting holes 24a and 24b.

Figure 3:
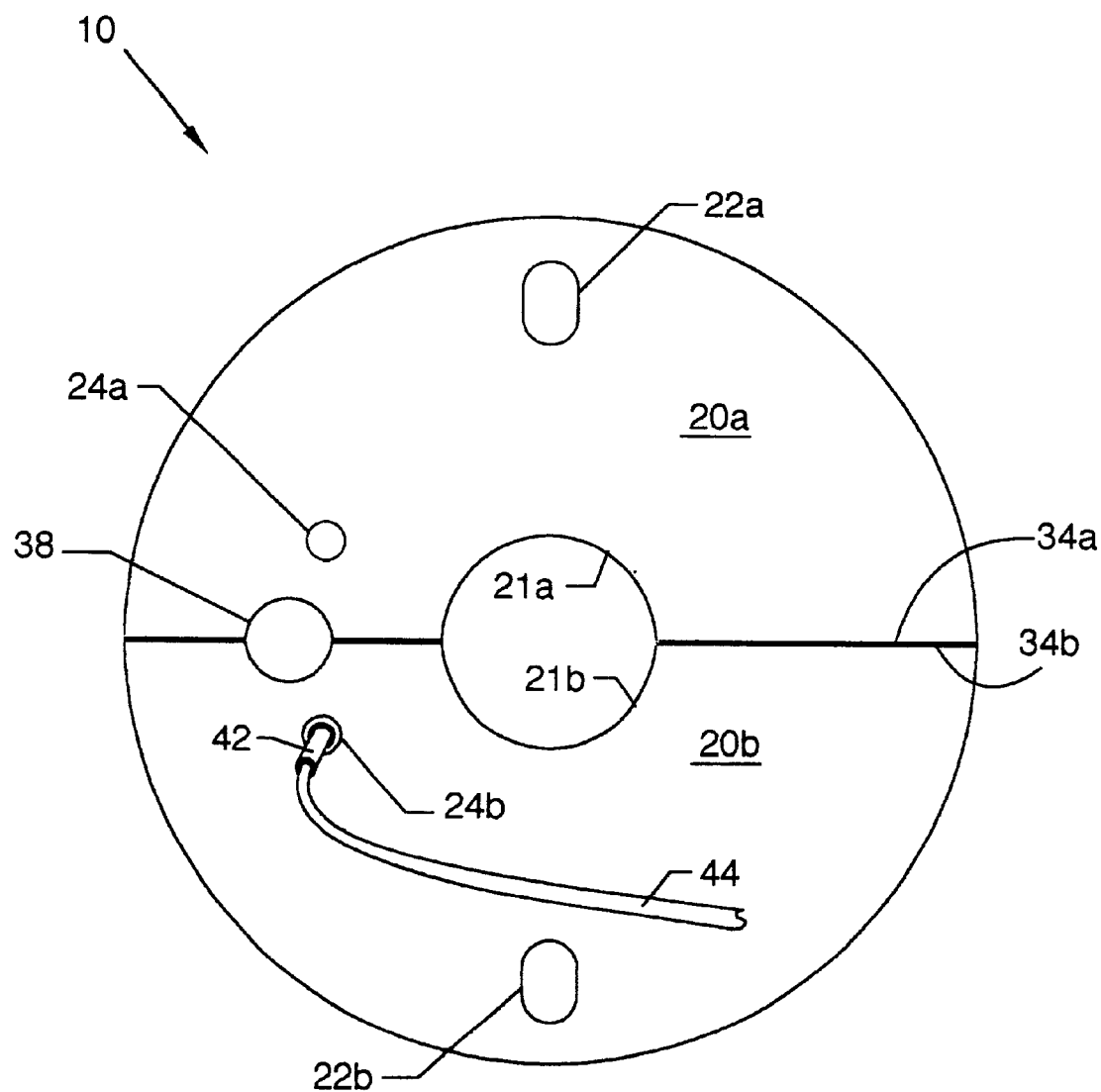
FIG. 3 illustrates a back view of the brake drum cover system.

FIG. 3 illustrates a back view of the brake drum cover system 10, where all numerals correspond to those elements previously described. Illustrated in particular is grease fitting 42 opposite the exterior grease fitting and appropriate tubing 44 connected to be connected to the brake system, which allows the brakes to be greased without removing the brake drum cover system 10. The axle housing 18, the S-cam 40 and the vertical alignment screws 36a–36n are not illustrated, but it is assumed the are in the same position as in FIG. 2.

MODE OF OPERATION

With reference to FIGS. 1–3 the installation of the brake drum cover system 10 is now described. Appropriate grease fittings are installed on both sides of either grease fitting hole 24a or 24b. The tubing 44 is then secured over and about the interior grease fitting 42 at one end and secured over and about the grease fitting of the brake system at the opposite end. The semicircular plates 20a and 20b are then positioned over and about the axle housing 18 and S-cam 40 where they are secured together at interrupted edges 34a and 34b by nut and bolt sets 28a and 28b, as shown in FIG. 1. The brake drum cover system 10 is then slid into close proximity to the brake drum 12. Once centered and aligned vertically, the vertical alignment screws 36a–36n are then screwed through appropriate holes in the axle housing collars 26a and 26b where they secure the brake drum cover system 10 to the axle housing 18.

Various modifications can be made to the present invention without departing from the apparent scope hereof.

It is claimed:

1. A brake drum cover system for engagement over an axle next to brakes of a wheel comprising:

a. two opposing semicircular plates with an axle housing radius;

b. opposing collars about said axle housing radius including opposing flanges with a hole in each end of said flange;

c. means for adjusting distance of said flanges with respect to said axle;

d. a plurality of screws in the opposing collars;

e. said screws securing the brake drum cover system to the axle housing; and, f. means for vertical adjustment of the brake drum cover system.

* * * * *